(12) United States Patent
Voloshin

(10) Patent No.: US 12,104,623 B2
(45) Date of Patent: Oct. 1, 2024

(54) THREE-POSITION PNEUMATIC OR HYDRAULIC POWER CYLINDER

(71) Applicants: Roman Leonidovich Voloshin, Novgorod (RU); Dmitrii Victorovich Panteleev, Novgorod (RU)

(72) Inventor: Roman Leonidovich Voloshin, Novgorod (RU)

(73) Assignee: Dmitril Panteleev, Novgorod (RU)

( * ) Notice: Subject to any disclaimer, the term of this patent is extended or adjusted under 35 U.S.C. 154(b) by 0 days.

(21) Appl. No.: 18/017,717

(22) PCT Filed: Jul. 24, 2020

(86) PCT No.: PCT/RU2020/000392
§ 371 (c)(1),
(2) Date: Jan. 24, 2023

(87) PCT Pub. No.: WO2022/019800
PCT Pub. Date: Jan. 27, 2022

(65) Prior Publication Data
US 2023/0304515 A1 Sep. 28, 2023

(51) Int. Cl.
*F15B 15/14* (2006.01)
*F15B 11/12* (2006.01)
*F15B 15/20* (2006.01)

(52) U.S. Cl.
CPC .......... *F15B 15/1409* (2013.01); *F15B 11/12* (2013.01); *F15B 15/20* (2013.01)

(58) Field of Classification Search
CPC ........ F16H 61/30; F15B 11/123; F15B 11/12; F15B 15/1409
See application file for complete search history.

(56) References Cited

U.S. PATENT DOCUMENTS 3,312,146 A 4/1967 Quere et al.

FOREIGN PATENT DOCUMENTS

CN 108980139 Y 12/2018
DE 3213758 Y 1/1983
(Continued)

*Primary Examiner* — Abiy Teka
(74) *Attorney, Agent, or Firm* — Zhigang Ma

(57) ABSTRACT

The invention relates to hydraulic cylinder devices and can be used in vehicle transmissions. A three-position pneumatic or hydraulic cylinder consists of a housing having end caps, two pistons, a rod, and supply channels for a working fluid, each piston being configured for limited movement along the rod as a result of a central protuberance, which separates the pistons, and peripheral protuberances on the rod, and being configured for limited movement inside the housing. The central protuberance is configured in the form of a bushing, and an annular protuberance is configured on the inside surface of the housing. Said bushing and said protuberance form a hermetic moveable coupling of the shaft/opening type. Separate channels are provided for supplying working fluid to the chambers formed by each piston and the corresponding end of the housing, and a shared channel is provided for supplying working fluid to the chambers formed by each piston and the central protuberance and bushing; or, separate channels are provided for supplying working fluid to the chambers formed by each piston and the central protuberance and bushing, and a shared channel is provided for supplying working fluid to the chambers formed by each piston and the corresponding end of the housing.

10 Claims, 3 Drawing Sheets

(56) References Cited

FOREIGN PATENT DOCUMENTS

SE 457821 B * 1/1989 ............ F15B 11/123
WO 1992011462 Y 7/1992

* cited by examiner

THREE-POSITION PNEUMATIC OR HYDRAULIC POWER CYLINDER

FIELD OF THE INVENTION

The invention relates to volumetric pneumatic or hydraulic drives, and more specifically to pneumatic (hydraulic) hydraulic cylinder devices and can be used in robotic production lines, drives of various purpose machines including in vehicle transmissions.

PRIOR ART

For example, a synchronizer shifting hydraulic drive is known (Patent RU2545543C2). The drive comprises a cylinder and piston arranged to move inside the cylinder separating the first and second chambers.

The first chamber volume is the smallest when the drive is in a first engagement position and the second chamber volume is the smallest when the drive is in a second engagement position. The piston also delimits the third chamber in the cylinder, which volume is the smallest when the drive is in a neutral position.

This drive is technologically complex product, in particular, its performance directly depends on the accuracy of pressurization in a particular chamber.

A three-position hydraulic cylinder is known (Patent RU2079007C1) comprising a housing with windows for load connection and working fluid supply, in which cavity closed by covers a bored piston and plungers interacting with it and covers are located wherein the plungers are located in the piston bore that is equipped with stops limiting its stroke.

A pin located perpendicular to the longitudinal axis of the body is used as a working element interacting with the load. The disadvantage of this design is an inability to move the working element to the ends of housing.

A three-position pneumatic cylinder (Patent HU87364B) was chosen as a prototype that consists of a housing having end caps, two pistons, a rod, channels for a working fluid. The pistons divide the interior of the cylinder into three chambers, wherein each piston is configured for limited movement along the rod as a result of a central protuberance, which separates the pistons and peripheral protuberances on the rod, and configured for limited movement inside the housing as a result of the protrusions formed on the inside surface of the housing. A stop element is fixed on the rod between two pistons whereon an inlet port of the working fluid (air) supply channel to the chamber between the pistons.

The disadvantages of the known prototype device are the following design features:

Large dimensions due to the presence of the upper end cap.

Inability to implement additional rod outlets from one of the cylinder end surfaces and, for example, a perpendicularly installed pin.

The end surface of the protuberance (bushing) on the rod (in the working fluid supply area) acts as a piston and, therefore, affects any rod movement, that is, to set the rod to medium or neutral position an additional amount of energy (pressure) of the working fluid should be required.

The potential pressure difference when the rod is in the middle position may result in the so-called rod run-out beyond the middle position followed by return (travel) to the middle position. This factor is adverse in devices where this should not be according to the work functions.

Rod alignment is ensured by its contacts with covers and pistons that, with significant rod loading, can affect the uninterrupted operation time of the device. Alignment at seal points looks at least doubtful. HU87364B provides for increased piston fitting dimensions ensuring the rod alignment and this increases the device dimensions, weight and material consumption.

A more complex manufacturing design is used, for example, a retaining protuberance in the middle of the bushing shall be specifically fit relative to the working fluid outlet or have a evidently complex design with a system of grooves and holes while ensuring impact strength; the use of retaining rings also complicates the design; an additional upper end cap is used that shall be secured and sealed.

SUMMARY OF THE INVENTION

The object of the invention was to provide a device that is free of the above disadvantages. The technical result is a design simplification and improved reliability, speed and accuracy of the device.

This problem is solved by a three-position pneumatic or hydraulic cylinder that consists of a housing two pistons, a rod, and working fluid supply channels. The housing is provided with two end caps and an annular protuberance, where the two end caps are provided at two end portions of the housing, and the annular protuberance is formed on an inside surface of the housing and located between the two end portions of the housing. The rod is arranged inside the housing and configured to perform limited movement within the housing. Where the rod is provided with two peripheral protuberances at its two end portions and a central protuberance located between the two peripheral protuberances. The central protuberance is configured in a form of a cylindrical bushing, and sleeved in the annular protuberance to form, with the annular protuberance, a hermetic moveable coupling of the shaft/opening type. The two pistons are sleeved on the rod and perform limited movement along the rod due to the peripheral protuberances on the rod, where the central protuberance is configured to separate the two pistons. Each piston, a corresponding end of the housing, and a corresponding end cap cooperate to form a first chamber. Each piston, the housing, the annular protuberance, and the bushing cooperate to form a second chamber. The working fluid supply channels are formed in the housing or in the housing and the rod, where each of the first chamber and the second chamber communicates with one of the working fluid supply channels.

A protuberance is understood to mean any part such as the bushing, part of the housing or the rod that limits the movement of the pistons.

Three preferred embodiments of the invention are proposed determined by the implementation of the working fluid supply channels.

In the first preferred embodiment, the working fluid supply channels are formed in the housing and include: separate channels in one-to-one communication with the first chambers respectively, and a shared channel communicating with each second chamber.

In the second preferred embodiment, the working fluid supply channels are formed in the housing and include: separate channels in one-to-one communication with the second chambers respectively, and a shared channel communicating with each first chamber.

In the third preferred embodiment, the working fluid supply channels include separate channels formed in the housing and in one-to-one communication with the second chambers respectively, and a shared channel formed in the housing and the rod, and communicating with the first chambers.

All embodiments may be supplemented by providing at least one side pin inclined to an axial direction of the rod, where one end of the side pin is connected to the bushing, an other end of the side pin extends, through a bore formed on the annular protuberance, outside of the housing for load interaction.

In one device embodiment, only the above side pin is provided for load interaction. In principle, a design may be implemented with one or two rod outlets, one or more pins in various combinations depending on the specific purpose of the device. The bushing with the pin may also rotate sectorally around the axial direction of the bushing.

BRIEF DESCRIPTION OF THE DRAWINGS

The invention is illustrated by graphic materials: prototype drawings and photographs.

EMBODIMENT OF THE INVENTION

Figure 1:
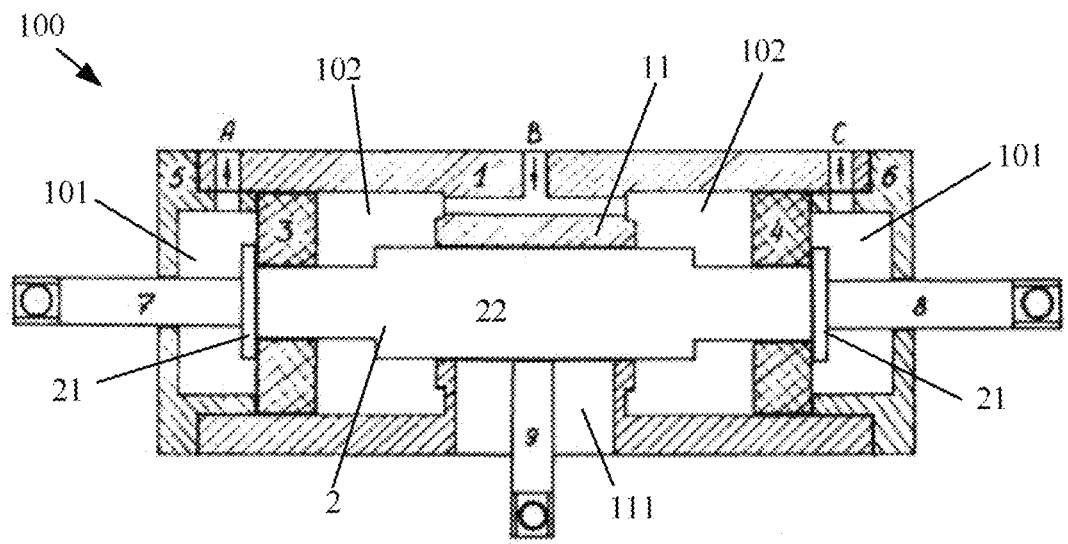
FIG. 1 shows a longitudinal sectional view of a first preferred embodiment of a cylinder, central (middle) position.

Referring to FIG. 1, a three-position cylinder 100 includes a housing 1, a rod 2, two pistons 3 and 4, and two end caps 5 and 6. The two end caps 5 and 6 are provided at two end portions of the housing 1. In this embodiment, the housing 1 is further provided with an annular protuberance 11 formed on its inside surface and located between its two end portions.

The rod 2 is arranged inside the housing 1 and configured to perform limited movement within the housing 1. In this embodiment, the rod 2 is provided with two peripheral protuberances 21 at its two end portions and a central protuberance 22 located between the two peripheral protuberances 21. The central protuberance 22 is configured in a form of a cylindrical bushing, and sleeved in the annular protuberance 11 to form, with the annular protuberance 11, a hermetic moveable coupling of the shaft/opening type. In this embodiment, the rod 2 is made of a low friction sliding material.

The two pistons 3 and 4 are sleeved on the rod 2 and perform limited movement along the rod 2 due to the peripheral protuberances 21 on the rod 2. The central protuberance 22 is configured to separate the two pistons 3 and 4.

In this embodiment, the three-position cylinder 100 further includes end rod elements 7, 8, and a side pin 9. One end of the end rod element is connected to the end portion of the rod 2 along an axial direction of the rod 2, an other end of the end rod element extends outside of the housing 1 through a corresponding end cap. The peripheral protuberance 21 is arranged on the end rod element and located between two end portions of the end rod element. The side pin 9 is inclined to the axial direction of the rod 2, where one end of the side pin 9 is connected to the bushing 22, an other end of the side pin 9 extends, through a bore 111 formed on the annular protuberance 11, outside of the housing 1 for load interaction. In an embodiment, the bushing 22 with the side pin 9 may also rotate sectorally around the axial direction of the bushing 22. In other embodiment, the end rod elements 7, 8, and the side pin 9 can be provided to the rod 2 in various combinations, for example, only the side pin 9 or one of the end rod elements 7, 8 is provided to the rod 2.

In this embodiment, as shown in FIG. 1, each piston, a corresponding end of the housing 1, and a corresponding end cap cooperate to form a first chamber 101. Each piston, the housing 1, the annular protuberance 11, and the bushing 22 cooperate to form a second chamber 102.

The cylinder 100 also comprises working fluid (compressed air or liquid) supply channels A, B and C formed in the housing 1 or in the housing 1 and the rod 2, where each of the first chamber 101 and the second chamber 102 communicates with one of the working fluid supply channels.

In a first preferred embodiment (FIGS. 1 and 2), the working fluid supply channels are formed in the housing and include separate channels A and C and a shared channel B. The separate channels A and C are in one-to-one communication with the first chambers 101 respectively. The shared channel B communicates with each second chamber 102.

In a second preferred embodiment (FIGS. 3 and 4), the working fluid supply channels are formed in the housing and include separate channels A and C and a shared channel B. The separate channels A and C are in one-to-one communication with the second chambers 102 respectively. The shared channel B communicates with each first chamber 101.

Figure 5:
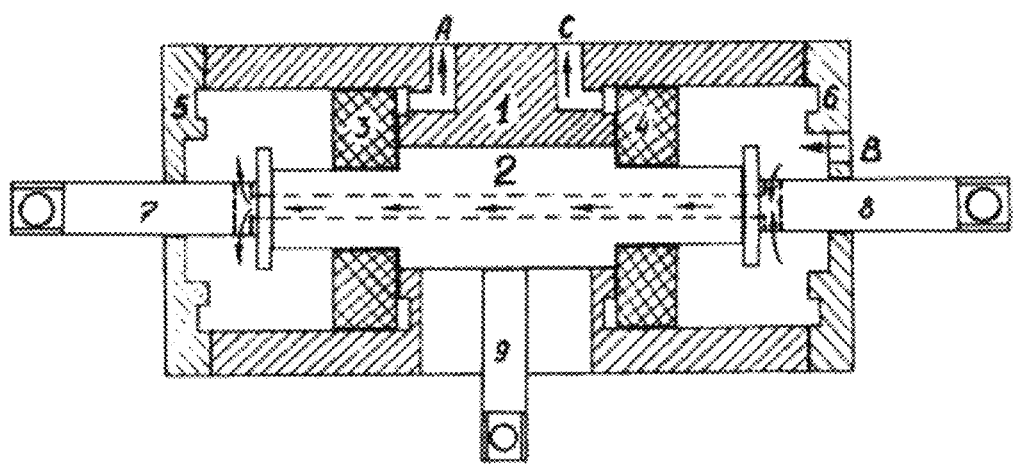
FIG. 5 shows a longitudinal sectional view of a third preferred embodiment of a cylinder, central (middle) position.

In a third preferred embodiment (FIG. 5), the working fluid supply channels include separate channels A and C and a shared channel B. The separate channels A and C are formed in the housing 1 and in one-to-one communication with the second chambers 102 respectively. The shared channel B is formed in the housing 1 and the rod 2, and communicates with each first chamber 101.

The three-position cylinder 100 is operable with any number of output load interacting elements (end rod elements 7, 8, side pin 9). When using the three-position cylinder 100 without the end rod element(s) 7, 8, a protruding piston stroke limiter (pistons 3, 4) shall be installed on the rod 2 and the end cap (caps 5, 6) with no rod holes.

The device operation of the three-position cylinder 100 according to the first preferred embodiment (compressed air) is as follows.

When compressed air is supplied to channel B, as shown in FIG. 1, the piston 3 moves to the left, and the piston 4 moves to the right, the pistons reach the protuberances of the caps 5, 6 and rest against the peripheral protuberances 21 on the end rod elements 7 and 8, to set the rod 2 in the middle position (FIG. 1). Channels A and C are open to the atmosphere at that moment.

Figure 2:
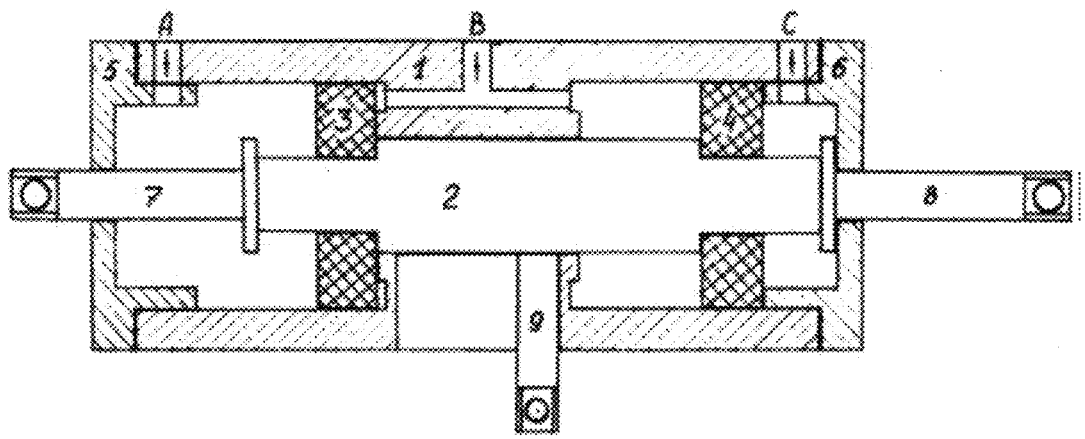
FIG. 2 shows a longitudinal sectional view of a first preferred embodiment of a cylinder, rightmost position.

When compressed air is supplied to channel A, as shown in FIG. 2, the piston 3 moves to the right and, having reached the protuberance of the bushing 22, pushes it to the right, then the piston 3 rests against the annular protuberance 111 of the housing 1, and the bushing 22 rests against the piston 4 that rests against the end cap 6, thereby the rod 2 with the end rod elements 7, 8 and the side pin 9 is set to the rightmost position (FIG. 2). Channels B and C are open to the atmosphere at that moment.

Movement to the leftmost position is made in the opposite (mirror) order relative to the movement to the rightmost position.

If the housing 1, the protuberances of the end caps 5, 6, and the rod 2 have asymmetrical design, the rod 2 may be retained in the required (shifted) intermediate position relative to the central (middle) position.

Figure 3:
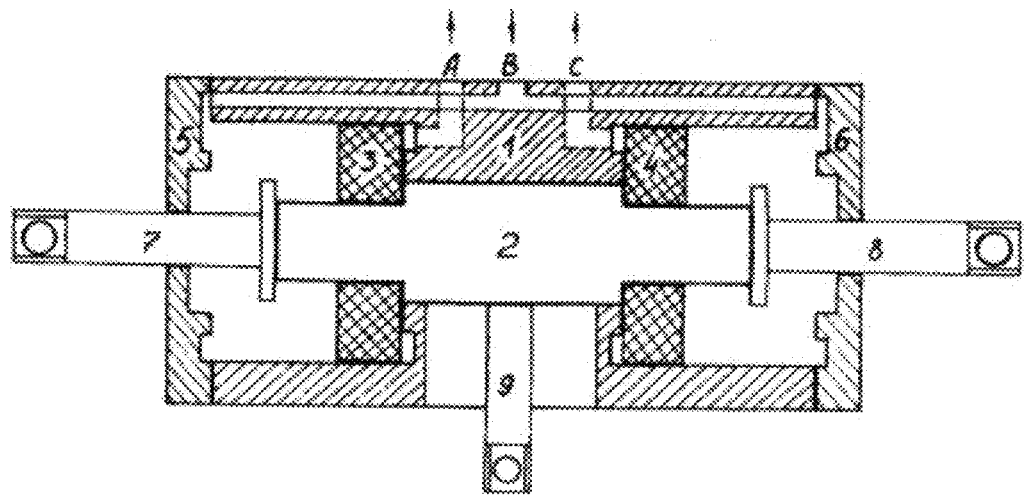
FIG. 3 shows a longitudinal sectional view of a second preferred embodiment of a cylinder, central (middle) position.
Figure 4:
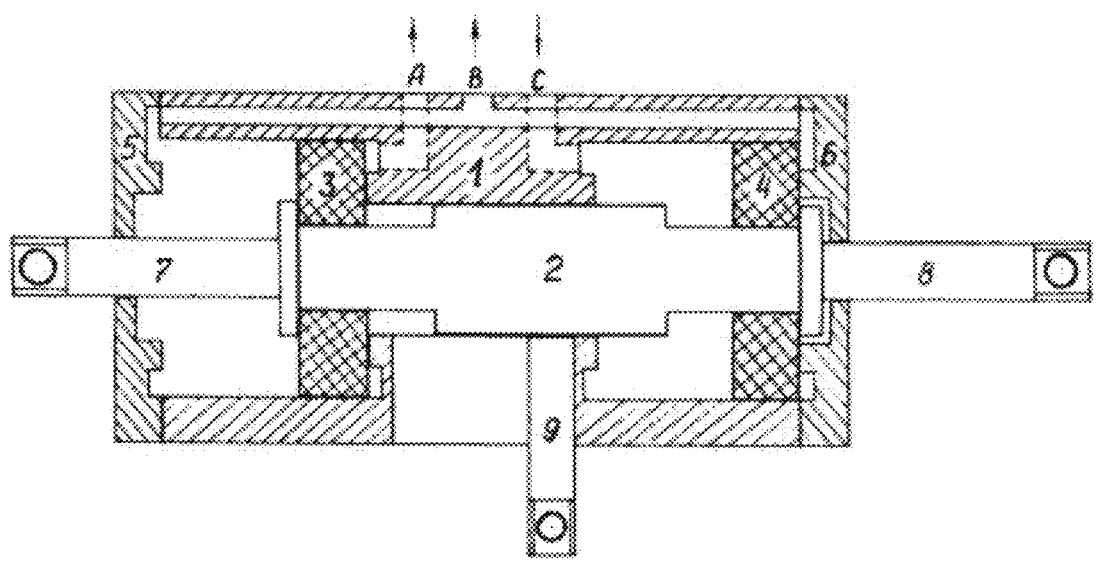
FIG. 4 shows a longitudinal sectional view of a second preferred embodiment of a cylinder, rightmost position.

The device operation of the three-position cylinder 100 according to the second preferred embodiment (compressed air) is as follows (FIGS. 3, 4).

The three-position cylinder 100 is also operable with any number of output load interacting elements (end rod elements 7, 8, side pin 9). When using the three-position cylinder 100 without the end rod element(s) 7, 8, a protruding piston stroke limiter (pistons 3, 4) shall be installed (as in the first preferred embodiment) on the rod 2 and the end cap (caps 5, 6) with no rod holes.

When compressed air is supplied to channel B, as shown in FIG. 3, the piston 3 moves to the right, and the piston 4 moves to the left, the pistons reach the protuberances of the bushing 22 and rest against the housing 1 to set the rod 2 with the end rod elements 7, 8 and the side pin 9 in the middle position. Channels A and C are open to the atmosphere at that moment.

When compressed air is supplied to channel C, as shown in FIG. 4, the piston 4 moves to the right and, having reached the peripheral protuberances 21 on the end rod element 8, moves the bushing 22 to the right, the end rod element 7 rests against the piston 3, and the rod 2 with the end rod elements 7, 8 and the side pin 9 is set to the rightmost position. Channels A and B are open to the atmosphere at that moment.

Movement to the leftmost position is made in the opposite (mirror) order relative to the movement to the rightmost position.

If the housing 1 and the rod 2 have asymmetrical design, the rod 2 may be retained in the required (shifted) intermediate position relative to the central (middle) position.

The operation principle of the three-position cylinder 100 under liquid pressure is similar to the operation with compressed air but the channels of the main liquid lines that are not under high pressure at the rod repositioning shall open to the main low-pressure liquid line and expansion tank.

INDUSTRIAL APPLICABILITY

The prototype device (without the side pin 9) during testing demonstrated the operational capability, solved the problem and achieved the said technical result.

No failures, partial engagement and interruptions recorded during trial operation. It should also be noted that when any of three said positions is reached, the rod (and/or pin) driving (moving) force is the same, therefore it is valid to say that the cylinder is a power cylinder if ensured that all three positions are reached. The driving (moving) device is also operable with a low joint tightness but to ensure force retention in the reached position (under the working fluid pressure) appropriate tightness and sealing in the pistons and end caps shall be provided.

The invention claimed is:

1. A three-position pneumatic or hydraulic cylinder comprising:
   a housing provided with two end caps and an annular protuberance, wherein the two end caps are provided at two end portions of the housing, and the annular protuberance is formed on an inside surface of the housing and located between the two end portions of the housing;
   a rod arranged inside the housing and configured to perform limited movement within the housing; wherein the rod is provided with two peripheral protuberances at its two end portions and a central protuberance located between the two peripheral protuberances; wherein the central protuberance is configured in a form of a cylindrical bushing, and sleeved in the annular protuberance to form, with the annular protuberance, a hermetic moveable coupling of the shaft/opening type;
   working fluid supply channels formed in the housing or in the housing and the rod; and
   two pistons sleeved on the rod and perform limited movement along the rod due to the peripheral protuberances on the rod; wherein the central protuberance is configured to separate the two pistons;
   wherein each piston, a corresponding end of the housing, and a corresponding end cap cooperate to form a first chamber; each piston, the housing, the annular protuberance, and the bushing cooperate to form a second chamber; each of the first chamber and the second chamber communicates with one of the working fluid supply channels.

2. The three-position cylinder according to claim 1, wherein the working fluid supply channels are formed in the housing and comprise:
   separate channels in one-to-one communication with the first chambers respectively; and
   a shared channel communicating with each second chamber.

3. The three-position cylinder according to claim 2, wherein the cylinder further comprises at least one side pin inclined to an axial direction of the rod, wherein one end of the side pin is connected to the bushing, an other end of the side pin extends, through a bore formed on the annular protuberance, outside of the housing for load interaction.

4. The three-position cylinder according to claim 1, wherein the working fluid supply channels are formed in the housing and comprise:
   separate channels in one-to-one communication with the second chambers respectively; and
   a shared channel communicating with each first chamber.

5. The three-position cylinder according to claim 4, wherein the cylinder further comprises at least one side pin inclined to an axial direction of the rod, wherein one end of the side pin is connected to the bushing, an other end of the side pin extends, through a bore formed on the annular protuberance, outside of the housing for load interaction.

6. The three-position cylinder according to claim 1, wherein the cylinder further comprises at least one side pin inclined to an axial direction of the rod, wherein one end of the side pin is connected to the bushing, an other end of the side pin extends, through a bore formed on the annular protuberance, outside of the housing for load interaction.

7. The three-position cylinder according to claim 6, wherein the cylinder further comprises at least one end rod element, wherein one end of the end rod element is connected to the end portion of the rod along the axial direction of the rod, an other end of the end rod element extends outside of the housing through a corresponding end cap; wherein the peripheral protuberance is arranged on the end rod element and located between two end portions of the end rod element.

8. The three-position cylinder according to claim 1, wherein the working fluid supply channels comprise:
   separate channels formed in the housing and in one-to-one communication with the second chambers respectively; and
   a shared channel formed in the housing and the rod, and communicating with each first chamber.

9. The three-position cylinder according to claim 8, wherein the cylinder further comprises at least one side pin inclined to an axial direction of the rod, wherein one end of the side pin is connected to the bushing, an other end of the side pin extends, through a bore formed on the annular protuberance, outside of the housing for load interaction.

10. The three-position cylinder according to claim 1, wherein the cylinder further comprises at least one end rod element, wherein one end of the end rod element is connected to the end portion of the rod along an axial direction of the rod, an other end of the end rod element extends outside of the housing through a corresponding end cap; wherein the peripheral protuberance is arranged on the end rod element and located between two end portions of the end rod element.

* * * * *